W. B. GRANNATT.
STREET CLEANING CART.
APPLICATION FILED JAN. 10, 1917.

1,237,506.

Patented Aug. 21, 1917.

Inventor
W. B. GRANNATT
By Watson E. Coleman
Attorney

UNITED STATES PATENT OFFICE.

WILLIAM B. GRANNATT, OF LOS ANGELES, CALIFORNIA.

STREET-CLEANING CART.

1,237,506.

Specification of Letters Patent.   Patented Aug. 21, 1917.

Application filed January 10, 1917. Serial No. 141,713.

*To all whom it may concern:*

Be it known that I, WILLIAM B. GRANNATT, a citizen of the United States, residing at Los Angeles, in the county of Los Angeles and State of California, have invented certain new and useful Improvements in Street-Cleaning Carts, of which the following is a specification, reference being had to the accompanying drawings.

This invention relates to an improved cart for use in the cleaning of streets and has for its primary object to provide a cart which is so constructed that the body or container for the material may be easily and quickly removed from the wheeled frame and a new container secured in position thereon.

The invention has for a more particular object to provide a wheel supported frame including a base portion, a series of uprights fixed to the rear side thereof and having hooks for engagement over the rear wall of the pan or scoop, and adjustable uprights at the opposite ends of the frame adapted for clamping engagement upon the end walls of said scoop whereby the same is securely retained in position.

It is an additional object of the invention to provide a device for the above purpose which is simply and durably constructed, highly serviceable and convenient for the purpose in view, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a perspective view of my improved wheel cart;

Figure 1:
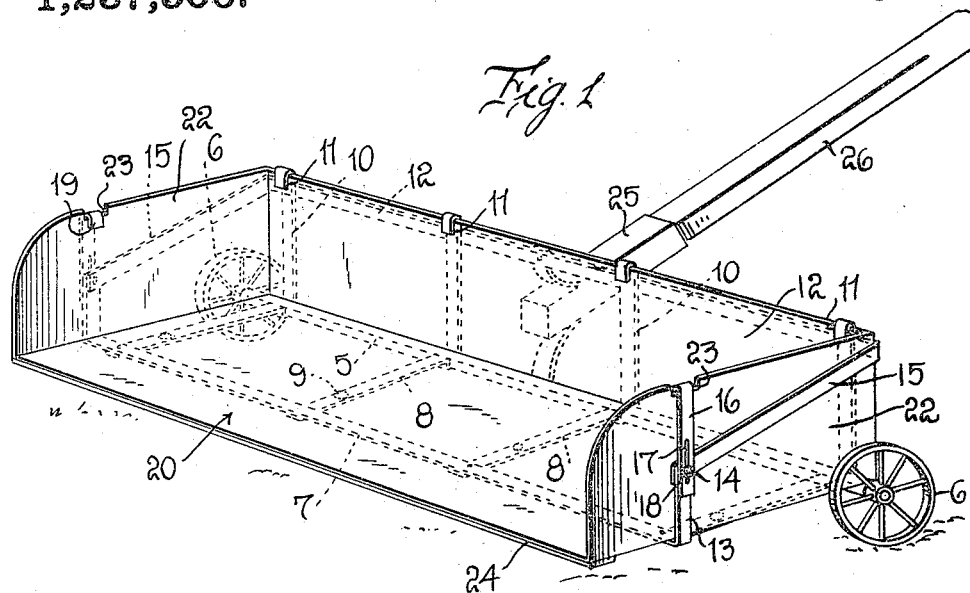
Figure 2:
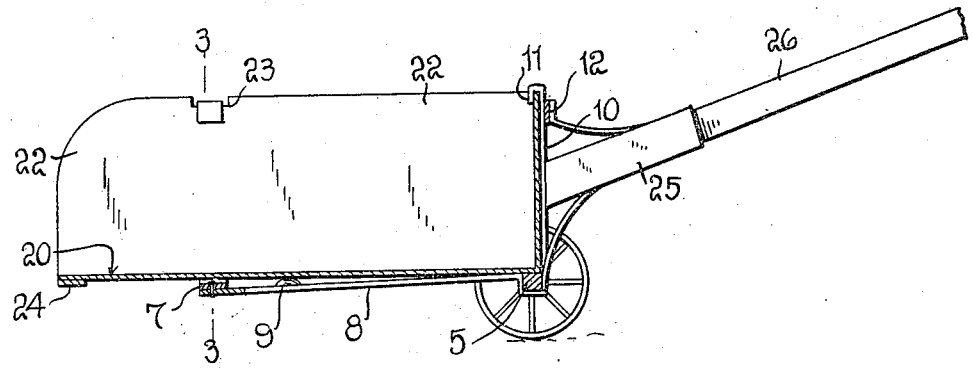
Fig. 2 is a vertical section.
Figure 3:
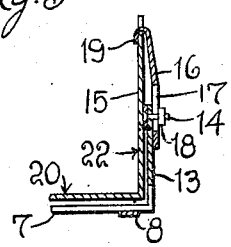
Fig. 3 is a section taken on the line 3—3 of Fig. 2.

Referring in detail to the drawing, 5 designates the axle on the opposite ends of which the supporting wheels 6 are revolubly mounted. The front longitudinal frame bar 7 is disposed in parallel relation to the axle 5 and connected thereto by means of a plurality of spaced bars 8. Each of the bars 8 is slightly inclined downwardly, as clearly seen in Fig. 2, and is provided adjacent its forward end with an upwardly projecting lug or protuberance 9.

At the rear ends of the bars 8, frame uprights 10 are fixed to the axle 5 and are provided upon their upper ends with the forwardly and downwardly disposed hooks 11. The upper ends of these uprights 10 are connected by the bar 12 extending above and in parallel relation to the axle 5. The opposite ends of the frame bar 7 are vertically extended, as at 13, and in the upper end of each of these vertical extensions a bolt 14 is fixed, said bolts also securing the forward ends of the inclined brace bars 15 to the ends 13 of the bar 7. The rear ends of the bars 15 are bolted or otherwise rigidly fixed to the upper ends of the end uprights 10. A clamping bar 16 is mounted upon each end 13 of the bar 7 and is provided with a slot 17 therein which receives the bolt 14. A clamping nut 18, threaded upon the end of the bolt, secures the bar 16 in its adjusted position. The upper end of the bar 16 is inwardly and downwardly turned to provide a hook 19 thereon.

20 designates the scoop or container for the material, having a rear wall 21 and end walls 22. These end walls are provided in their upper edges and adjacent their forward ends with notches or recesses 23, and to the bottom wall of the pan, at its forward end and upon the under side thereof, a wear strip 24 is secured.

In securing the pan or scoop in place upon the wheeled frame, the upper edge of the rear wall 21 of the scoop is engaged under the hooks 11 on the uprights 10, the bottom wall of the pan resting upon the upwardly projecting lugs 9 on the strips 8. The bars 16 are then forced downwardly and the hooks 19 thereof engaged in the notches 23 in the end walls of the pan. The pressure of these hooks upon the upper edges of the end walls, tends to tilt the pan upon the lugs 9 and force the upper edge of its rear wall into tight engagement with the hooks 11. The nut 18 is then adjusted to tightly secure the bars 16 in position upon the upwardly projecting ends 13 of the frame bar 7. Thus, the pan or scoop is securely held against all possibility of shifting movement upon the wheel frame.

To the axle bar 9 and the frame bar 12, a socket 25 is suitably secured and adapted to receive one end of a handle bar 26, whereby the cart may be conveniently propelled.

From the foregoing description, taken in connection with the accompanying drawing, the construction, manner of operation and several advantages of the device will be clearly and fully understood. In use, it will be understood that the forward edge of the bottom wall of the pan 20 is lowered into contact with the ground or road surface and the dirt swept into the pan. The pan or container may be readily removed from the wheel frame by releasing the bars 16 and shifting the same upwardly out of the recesses 23 in the end walls of the pan, and a new pan or container can then be easily placed in position upon the frame and securely clamped thereon. It will thus be seen that I have provided a wheeled cart or scoop for use by street cleaners, which is highly convenient and serviceable in practical use, as well as exceedingly strong and durable. It is, of course, manifest that the device may be constructed in various sizes, and the pan or scoop made of different capacities. The device is also susceptible of considerable modification in the form, proportion and arrangement of the several elements employed, and it is, therefore, to be understood that I reserve the privilege of adopting all such legitimate changes as may be fairly embodied within the spirit and scope of the invention as claimed.

Having thus fully described my invention, what I desire to claim and secure by Letters Patent is:—

1. A device of the character described including a wheel supported frame having a plurality of spaced uprights each provided upon its upper end with a clamping hook, a removable container adapted to be arranged upon said frame, the hooks of said uprights having clamping engagement upon the upper edge of the rear wall of the container, the end walls of the container being provided with notches in their upper edges, and vertically adjustable clamping hooks mounted upon the opposite ends of the frame adapted to seat in said notches.

2. A device of the character described including a wheel supported frame having spaced base bars each provided with an upwardly projecting lug, a container adapted to be removably mounted upon the frame, means carried by the frame with which the upper edge of the rear wall of the container has clamping engagement, and adjustable clamping means mounted on the frame for engagement upon the upper edges of the end walls of the container to rock the same upon the projections of the base bars and effectively engage the rear wall of the container with the first named means on the frame.

3. A device of the character described including a wheel supported frame having spaced base bars each provided with an upwardly projecting lug and a plurality of rear vertical uprights each having a hook on its upper end, a container adapted to be removably supported in the frame and having notches in the upper edges of its end walls and vertically adjustable clamping elements mounted on the frame for engagement in said notches and adapted to rock the container upon said lugs and clampingly engage the upper edge of its rear wall with the hooks on said uprights.

In testimony whereof I hereunto affix my signature in the presence of two witnesses.

WILLIAM B. GRANNATT.

Witnesses:
 JOE M. TAYLOR,
 FRANK L. TURNER.

Copies of this patent may be obtained for five cents each, by addressing the "Commissioner of Patents, Washington, D. C."